United States Patent [19]
Ohtani et al.

[11] 4,073,658
[45] Feb. 14, 1978

[54] HYDRAULIC CEMENT COMPOSITION

[75] Inventors: Naoteru Ohtani, Wakayama; Tutomu Koyama, Kainan; Takashi Takeuchi, Wakayama; Toshihiro Azuma, Wakayama; Morio Matsuda, Wakayama, all of Japan

[73] Assignee: Kao Soap Co., Ltd., Tokyo, Japan

[21] Appl. No.: 762,759

[22] Filed: Jan. 26, 1977

[30] Foreign Application Priority Data

Mar. 10, 1976 Japan ................................. 51-25883

[51] Int. Cl.$^2$ .................... C04B 7/352; C04B 7/353
[52] U.S. Cl. ........................................ 106/92; 106/93; 106/314; 106/315
[58] Field of Search ................... 106/92, 93, 314, 315

[56] References Cited

U.S. PATENT DOCUMENTS

| 3,414,420 | 12/1968 | Maravilla et al. | 106/92 |
| 3,503,768 | 3/1970 | Previte | 106/315 |

Primary Examiner—J. Poer
Attorney, Agent, or Firm—Blanchard, Flynn, Thiel, Beutell & Tanis

[57] ABSTRACT

A hydraulic cement composition containing a hydrogenation product of an oligosaccharide, such as a hydrolyzate of starch, cellulose or hemicellulose, having an average molecular weight of 300 to 3,500, as an agent for improving the properties of the cement.

3 Claims, No Drawings

HYDRAULIC CEMENT COMPOSITION

BACKGROUND OF THE INVENTION

1. Field of the Invention

The present invention relates to a hydraulic cement composition having improved properties, which is prepared by incorporating an oligosaccharide which has been subjected to a special treatment into a hydraulic cement material such as a cement paste, mortar or concrete. More specifically, the invention relates to a hydraulic cement composition comprising a hydraulic cement material having blended therein, a modified oligosaccharide formed by treating the terminal aldehyde groups (reducing groups) of an oligosaccharide having a molecular weight in the oligo range by an appropriate method to convert those aldehyde groups to hydroxyl groups.

2. Description of the Prior Art

Hydraulic cement is very important as an ingredient of mortar, concrete and the like. Various cement additives have heretofore been investigated and commercially utilized for facilitating working of mortar and concrete and for improving the strength, water impermeability and other properties of concrete structures. Among the cement additives used for various purposes, water-reducing agents are most popular. When the amount of water added during mixing of mortar or concrete is reduced by using a water reducing agent, as is well known in the art, the strength of the hardened mortar or cement structure is remarkably improved.

As water reducing agents for cement, there have heretofore been used, for example, lignin sulfonates, gluconates, sodium naphthalenesulfonate-formaldehyde high molecular weight condensates and compositions comprising a polysaccharide, calcium chloride and triethanolamine.

Lignin sulfonates are recovered from the sulfite pulp-preparing process, but they are disadvantageous because a uniform water reducing effect cannot be expected, they have a hardening retarding effect and the amount of air incorporated in the cement cmposition is increased and this has a bad influence on the physical properties of the concrete or mortar. Gluconates exhibit a hardening retarding effect when incorporated in concrete in large amounts and hence, practical use of gluconates involves significant problems. When incorporated in concrete at high concentrations, sodium naphthalesulfonate-formaldehyde condensates have a high water reducing effect without any hardening retarding effect, but when they are incorporated at low concentrations, their water reducing effect is drastically lowered and generally is lower than the water reducing effect of the lignin sulfonates or gluconates.

As a polysaccharide type cement additive, there is known hydrolyzed starch having an average degree of polymerization of 3 to 25 (see Japanese Patent Publication No. 12436/67). However, when this additive is used alone, a hardening retarding effect beyond the permissible range is manifested and therefore, it is ordinarily used in combination with calcium chloride and a water-soluble amine. In the case of a reinforced concrete structure, however, calcium chloride has an adverse effect on prevention of rusting of the reinforcing iron rods and it promotes formation of rust when hardened cement is dried, shrunk or cracked. Moreover, the flexural strength is reduced by the incorporation of calcium chloride, although the compression strength is improved.

An additive which has a high water reducing effect when added at a low concentration and which also exhibits a reduced hardening retarding effect has been desired in the art, but there has not been developed a cement additive meeting both of these requirements to a sufficient degree.

SUMMARY OF THE INVENTION

We have discovered that when there is added to hydraulic cement, an oligosaccharide in which the terminal aldehyde groups have been converted to hydroxyl groups by an appropriate method, namely, a hydrogenation product of an oligosaccharide, there are attained an unexpectedly superior water reducing effect and a highly improved compression strength, at a very low blending ratio of the additive based on the hydraulic cement. Further, the flexural strength is improved and the amount of air entrained in the cement is much reduced whereby to increase the density and prevent separation of aggregates. It also was found that by incorporation of such hydrogenated oligosaccharide, the flowability of the cement composition is increased, the operation efficiency is improved and no substantial retardation of cement hardening is caused even without using a hardening promotor such as calcium chloride. Based on these findings, we have now completed the present invention.

More specifically, in accordance with the present invention, there is provided a hydraulic cement composition comprising a hydraulic cement material and a product of hydrogenation of an oligosaccharide having an average molecular weight of from 300 to 3,500.

The product of hydrogenation of an oligosaccharide that is used in the present invention is obtained by hydrogenating a polysaccharide, preferably an oligosaccharide having an average molecular weight of 300 to 3,500, which oligosaccharide is formed by hydrolysis of starch, cellulose or hemicellulose.

Starch is a long-chain molecule comprising glucose units linked by α-glucoside bonds, and it can readily be hydrolyzed by an enzyme, a mineral acid, oxalic acid or the like. In the present invention, starch from any vegetable source can be used. Cellulose has a structure comprising glucose units linked by β-glucoside bonds, and since the β-glucoside bond as well as other acetal bonds can be cut by an acid catalyst, the cellulose molecule can easily be hydrolyzed by an acid catalyst. Hemicellulose as well as cellulose and lignin is present in wood or other lignified structures, it is readily soluble in an alkaline solution and it can be hydrolyzed by an acid relatively easily. As the saccharide groups constituting hemicellulose, there are known D-glucose, D-mannose, D-galactose, D-fructose, D-xylose L-arabinose, D-glucuronic acid, D-galacturonic acid and D-mannuronic acid. Procedures for hydrolyzing starch, cellulose and hemicellulose are well known and need not be described herein.

An aqueous solution of the thus-obtained hydrolyzate is prepared and the terminal aldehyde groups thereof are reduced and converted to hydroxyl groups by hydrogenation conducted under high temperature and high pressure conditions in the presence of a catalyst, for example, a Raney nickel catalyst, whereby there is obtained a hydrogenated oligosaccharide that is used in the present invention.

The hydrogenated oligosaccharide, according to the present invention, can be used in combination with other cement additives such as air entraining agents, cement swelling and dispersing agents, water proofing agents, strength enhancing agents and hardening promotors. Cements customarily used for preparing concrete and mortar, such as Portland cement, blast furnace cement, silica cement, alumina cement, diatomaceous earth cement, trass cement, slag cement and shale ash cement, can be used as the hydraulic cement in the present invention.

According to the invention, the oligosaccharide hydrogenation product is incorporated by blending in the cement in an amount of from 0.01 to 0.3% by weight, preferably 0.03 to 0.25% by weight, based on the weight of the hydraulic cement.

The present invention will now be described in detail by reference to the following illustrative Examples and Referential Examples, in which all references to "parts" and "%" are by weight unless otherwise indicated. It must be noted that the scope of the present invention is by no means limited by these Examples.

Preparation 1 (Preparation of Oligosaccharide)

A. Preparation of Oligosaccharide from Starch:

An oligosaccharide was prepared by hydrolyzing corn, potato or tapioca starch by using α-amylase.

B. Preparation of Oligosaccharide from Cellulose:

An oligosaccharide was prepared by dissolving commercially available cellulose powder in a mixed solution of $HCl-H_2SO_4(1 : 1)$, treating the solution at 20° C for 16 hours and performing fractionation with acetone at concentrations from 0 to 95%.

C. Preparation of Oligosaccharide from Hemicellulose:

Groundwood pulp was defatted with a liquid mixture of alcohol and benzene, delignified with sodium sulfite and bleaching powder and treated with a 17.5% aqueous solution of sodium hydroxide maintained at 20° C. After neutralization, hydrolysis was carried out at 160° to 180° C for 45 minutes to obtain an intended oligosaccharide.

Preparation 2 (Preparation of Hydrogenation Product of Oligosaccharide)

To 150 parts of a 25% aqueous solution of the oligosaccharide obtained in Preparation 1, there was added 4.5 parts of Raney nickel catalyst activated by a conventional method. Under agitation, the temperature and the hydrogen pressure were elevated to 120° C and 100 Kg/cm², respectively, and reaction was conducted for 3 hours. The reducing sugar analysis was carried out according to Fehling-Rhemann-Schol method. In each case, the reduction ratio was higher than 99.5%.

EXAMPLE 1

Mortar Test

Commercial Portland cement (manufactured by Onoda Cement): 1 part
Standard sand produced at Toyoura, Japan: 2 parts
Water: 1 part The above composition was used to prepare a plain mortar (free of an additive), as a standard. Samples were prepared with the addition of various additives and the amounts of water and sand were adjusted without changing the total volume so that the flow value was maintained at 139 ± 5 mm (the flow value of the standard mortar). The amount added of the additive was 0.10%, based on the cement, and the amount of entrained air was 4 to 5 vol. %.

The flow value, flexural strength and compression strength were determined according to JIS R-5201. The amount of air was determined according to the weight method specified in JIS A-1116. The setting time was determined according to the test method of ASTM C 403-61 T. The molecular weight of the oligosaccharide was determined by vapor pressure osmometry in a water solvent by using glucose as the standard substance.

The test results are shown in Table 1. From these results, it is seen that when a gluconate, sorbitol or an oligosaccharide is added, remarkable setting retardation occurs.

It will also be apparent that, according to the present invention, no substantial retardation of setting takes place and both the flexural strength and compression strength are improved.

In Table 1, the additives used are abbreviated as follows:

| Additive | Abbreviation |
|---|---|
| no additive | PL |
| gluconate | GL |
| lignin sulfonate | LS |
| commercially available polysaccharide* | PS-C |
| oligosaccharide from starch ($\overline{Mwn}=1100$) | SO |
| oligosaccharide from cellulose ($\overline{Mwn}=800$) | CO |
| oligosaccharide from hemicellulose ($\overline{Mwn}=900$) | HO |
| β-naphthalenesulfonic acid-formaldehyde condensate | MY |
| sorbitol | SOR |
| hydrogenation product of oligosaccharide from starch (1100)** | SO-HY |
| hydrogenation product of oligosaccharide from cellulose (800)** | CO-HY |
| hydrogenation product of oligosaccharide from hemicellulose (900)** | HO-HY |

Notes
*mixture of hydrolyzed starch, calcium chloride and water-soluble amine.
**the parenthesized value indicates the average molecular weight of oligosaccharide.

The water reduction ratio is calculated from the following equation:

$$WR = \frac{WNA - WA}{WNA} \times 100$$

in which
 WR is a water reduction ratio;
 WNA is net mixing water in the system without an additive; and
 WA is net mixing water in the system with an additive.

Table 1

| Additive | Water reduction Ratio (%) | Setting Time | | Flexural Strength (Kg/cm²) | | Compression Strength (Kg/cm²) | |
|---|---|---|---|---|---|---|---|
| | | Initiation (hours - minutes) | Completion (hours - minutes) | after 7 days | after 28 days | after 7 days | after 28 days |
| Comparison | | | | | | | |
| PL | 0 | 4 - 45 | 6 - 15 | 46.2 | 66.2 | 198 | 337 |

Table 1-continued

| Additive | Water reduction Ratio (%) | Setting Time | | Flexural Strength (Kg/cm²) | | Compression Strength (Kg/cm²) | |
|---|---|---|---|---|---|---|---|
| | | Initiation (hours - minutes) | Completion (hours - minutes) | after 7 days | after 28 days | after 7 days | after 28 days |
| MY | 0 | 5 - 00 | 6 - 30 | 46.5 | 66.5 | 213 | 386 |
| LS | 0.2 | 5 - 30 | 7 - 45 | 46.2 | 66.5 | 200 | 390 |
| PS-C | 0 | 5 - 00 | 6 - 30 | 48.5 | 63.7 | 214 | 371 |
| SO | 1.2 | 7 - 00 | 11 - 00 | 42.6 | 65.6 | 186 | 370 |
| CO | 1.3 | 7 - 00 | 10 - 45 | 43.6 | 66.0 | 190 | 365 |
| HO | 1.2 | 7 - 00 | 11 - 00 | 43.0 | 65.7 | 189 | 360 |
| GL | 1.4 | 7 - 30 | 10 - 00 | 46.8 | 70.1 | 198 | 420 |
| SOR | 0.6 | 6 - 30 | 9 - 00 | 45.0 | 65.1 | 180 | 356 |
| Present Invention | | | | | | | |
| SO-HY | 1.2 | 5 - 00 | 7 - 00 | 48.5 | 68.3 | 219 | 409 |
| CO-HY | 1.3 | 5 - 00 | 7 - 00 | 48.4 | 71.0 | 228 | 419 |
| HO-HY | 1.3 | 5 - 15 | 7 - 15 | 46.4 | 68.1 | 225 | 415 | latter comparative sample, the setting time is extraordinarily long.

Table 2

| Average Molecular Weight of Starting Oligosaccharide | Water Reduction Ratio (%) | Setting Time | | Flexural Strength (Kg/cm²) | | Compression Strength (Kg/cm²) | |
|---|---|---|---|---|---|---|---|
| | | Initiation (hours - minutes) | Completion (hours - minutes) | after 7 days | after 28 days | after 7 days | after 28 days |
| Comparison | | | | | | | |
| 6500 | −0.5 | 5 - 00 | 6 - 30 | 45.5 | 64.0 | 188 | 321 |
| 180 | 0.6 | 6 - 30 | 9 - 00 | 45.0 | 65.1 | 180 | 356 |
| Present Invention | | | | | | | |
| 3000 | 0.9 | 5 - 00 | 6 - 30 | 47.9 | 68.2 | 213 | 405 |
| 2300 | 1.1 | 5 - 00 | 6 - 45 | 48.1 | 68.5 | 219 | 402 |
| 1100 | 1.3 | 5 - 00 | 7 - 00 | 48.5 | 68.3 | 219 | 409 |
| 409 | 1.3 | 5 - 15 | 7 - 15 | 48.0 | 68.0 | 225 | 383 |
| Standard Sample (No additive) | 0 | 4 - 45 | 6 - 15 | 46.2 | 66.2 | 198 | 337 |

EXAMPLE 2

Effect of Molecular Weight on Properties of Cement Additive

The mortar test was conducted in the same manner as described in Example 1 using oligosaccharides of different molecular weight (those obtained by hydrolysis of starch were used). The results obtained are shown in Table 2.

From the results shown in Table 2, it is seen that the comparative sample showing a shorter setting time (hydrogenation product of the oligosaccharide having a higher molecular weight) is inferior to the standard sample with respect to the water reducing effect and compression strength. It also is seen that the comparative sample of the hydrogenation product of the oligosaccharide having a lower molecular weight is superior to the standard sample with respect to the water reducing effect and compression strength but in case of this

EXAMPLE 3

Effect of Amount of Additive Added to Cement

The hydrogenation product of an oligosaccharide having an average molecular weight of 1100 (obtained by hydrolysis of starch) was subjected to the mortar test under the same conditions as described in Example 1 and changing the amount the additive added to cement as indicated in Table 3. The results obtained are shown in Table 3.

For comparison, the mortar test was similarly conducted on an oligosaccharide having an average molecular weight of 1100 (hydrolyzate of starch) and changing the amount of this comparison additive added to cement as indicated in Table 4. The results obtained are shown in Table 4.

Table 3

| Incorporation Ratio (wt. %) of Hydrogenated Oligosaccharide Based on Cement | Water Reduction Ratio (%) | (Present Invention) Setting Time | | Flexural Strength (Kg/cm²) | | Compression Strength (Kg/cm²) | |
|---|---|---|---|---|---|---|---|
| | | Initiation (hours - minutes) | Completion (hours - minutes) | after 7 days | after 28 days | after 7 days | after 28 days |
| not added | — | 4 - 45 | 6 - 15 | 46.2 | 66.2 | 198 | 337 |
| 0.05 | 0.5 | 5 - 00 | 6 - 30 | 47.3 | 66.5 | 208 | 368 |
| 0.10 | 1.3 | 5 - 00 | 7 - 00 | 48.5 | 68.3 | 219 | 409 |
| 0.15 | 3.1 | 6 - 15 | 8 - 30 | 46.5 | 68.1 | 228 | 416 |
| 0.25 | 4.9 | 6 - 30 | 9 - 00 | 46.2 | 68.5 | 235 | 421 | ing effect and compression strength but in case of this

Table 4

| Incorporation Ratio (wt. %) of Oligosaccharide Based on Cement | Water Reduction Ratio (%) | (Comparison) Setting Time | | Flexural Strength (Kg/cm²) | | Compression Strength (Kg/cm²) | |
|---|---|---|---|---|---|---|---|
| | | Initiation (hours - minutes) | Completion (hours - minutes) | after 7 days | after 28 days | after 7 days | after 28 days |
| not added | — | 4 - 45 | 6 - 15 | 46.2 | 66.2 | 198 | 337 |

Table 4-continued

| Incorporation Ratio (wt. %) of Oligosaccharide Based on Cement | Water Reduction Ratio (%) | Setting Time (Comparison) | | Flexural Strength ($Kg/cm^2$) | | Compression Strength ($Kg/cm^2$) | |
|---|---|---|---|---|---|---|---|
| | | Initiation (hours - minutes) | Completion (hours - minutes) | after 7 days | after 28 days | after 7 days | after 28 days |
| 0.05 | 0.2 | 6 - 00 | 8 - 30 | 45.3 | 65.4 | 191 | 339 |
| 0.10 | 0.9 | 7 - 00 | 11 - 00 | 42.6 | 65.6 | 186 | 370 |
| 0.15 | 2.6 | 12 - 00 | 16 - 30 | 30.5 | 66.2 | 173 | 381 |
| 0.25 | 3.8 | 20 - 15 | 27 - 00 | 30.3 | 66.1 | 170 | 390 |

EXAMPLE 4

Concrete Test

Materials Used

Cement: commercial Portland cement manufactured by Onoda Cement (having a specific gravity of 3.17)
Fine aggregate: produced at Kinokawa, Japan (having a specific gravity of 2.60)
Coarse aggregate: ground stone produced at Takarazuka, Japan (having a maximum diameter of 20 mm and a specific gravity of 2.62)

Unit Amount of Cement

300 Kg/m$^3$

Fine Aggregate Ratio 45.0%

Measurement Items and Methods

Slump value: JIS A-1101
Air amount: JIS A-1116
Compression strength: JIS A-1108
Setting time: ASTM C 403-61T Additives Used and Abbreviations No additive: PL
Hydrogenation product of oligosaccharide: SO-HY (derived from starch, $\overline{Mwn}$ = 900)
Commercially available polysaccharide type: PS-C additive (mixture of oligosaccharide from starch, calcium chloride and ethanolamine)

Air Amount 1.5 - 1.7%

Water-Cement Ratio

61% when no additive was used.

Slump Value

Adjusted to 6.0 - 6.3 cm (in order to maintain a constant concrete volume, sand and gravel were further added in an amount corresponding to reduction of the amount of water (the aggregate ratio was maintained at 45%)).

The results obtained are shown in Table 5.

Table 5

| Additive | Incorporation Ratio (wt. %) Based on Cement | Water Reduction Ratio (%) | Setting Time | | Compression Strength Ratio (%) | | |
|---|---|---|---|---|---|---|---|
| | | | Initiation (hours - minutes) | Completion (hours - minutes) | after 3 days | after 7 days | after 28 days |
| Comparison | | | | | | | |
| PL | — | — | 5 - 30 | 7 - 00 | 100 | 100 | 100 |
| PS-C | 0.05 | 2.0 | 5 - 30 | 7 - 30 | 129 | 116 | 113 |
| PS-C | 0.10 | 2.9 | 5 - 45 | 7 - 45 | 131 | 120 | 116 |
| PS-C | 0.15 | 3.1 | 6 - 00 | 8 - 00 | 132 | 125 | 120 |
| Present Invention | | | | | | | |
| SO-HY | 0.05 | 3.7 | 5 - 30 | 7 - 45 | 131 | 120 | 116 |
| SO-HY | 0.10 | 9.0 | 6 - 00 | 8 - 00 | 136 | 134 | 128 |
| SO-HY | 0.15 | 10.0 | 6 - 30 | 8 - 45 | 143 | 143 | 139 |

The embodiments of the invention in which an exclusive property or privilege is claimed are defined as follows:

1. A hydraulic cement composition comprising hydraulic cement, water and, optionally, aggregate, said composition containing from 0.01 to 0.3 weight percent, based on the weight of said hydraulic cement, of a hydrogenated oligosaccharide having an average molecular weight of from 300 to 3500, wherein the hydrogenation has transformed the terminal aldehyde groups of the oligosaccharide to hydroxyl groups.

2. A composition according to claim 1 in which the amount of said hydrogenated oligosaccharide is from 0.03 to 0.25 weight percent, based on the weight of said hydraulic cement.

3. A composition according to claim 1 in which said oligosaccharide is a hydrolyzate of starch, cellulose or hemicellulose.

* * * * *